United States Patent

[11] 3,621,944

| [72] | Inventor | Keith W. Langley<br>London, England |
|------|----------|---------------------------------------|
| [21] | Appl. No. | 863,551 |
| [22] | Filed | Oct. 3, 1969 |
| [45] | Patented | Nov. 23, 1971 |
| [73] | Assignee | Westinghouse Brake and Signal Company,<br>Limited<br>London, England |
| [32] | Priorities | Oct. 23, 1968 |
| [33] | | Great Britain |
| [31] | | 50,220/68;<br>Oct. 23, 1968, Great Britain, No.<br>50,221/68 |

[54] A DISC BRAKE INCLUDING A COMPACT AUTOMATIC SLACK ADJUSTER AND PARKING BRAKE
13 Claims, 3 Drawing Figs.

[52] U.S. Cl. ............................................... 188/71.9,
188/72.6, 188/106 F, 188/196 BA
[51] Int. Cl. ................................................ F16d 55/20,
F16d 65/56
[50] Field of Search .................................... 188/71.7–71.9,
79.5 GE, 196 RR, 196 PR, 106 F

[56] References Cited
UNITED STATES PATENTS

| 1,975,217 | 10/1934 | White ........................... | 188/79.5 GE |
| 3,068,964 | 12/1962 | Williams et al. ............... | 188/196 PRR X |
| 3,261,434 | 7/1966 | Brucker ......................... | 188/196 RR |
| 3,376,956 | 4/1968 | Press ............................. | 188/71.9 |

FOREIGN PATENTS

| 1,373,335 | 8/1964 | France ............................ | 188/196 RR |

*Primary Examiner*—Duane A. Reger
*Attorney*—Larson, Taylor and Hinds

ABSTRACT: A caliper disc brake having a pressure responsive member which acts on a second member which in turn acts on a driven member to actuate the brake discs. The second member also forms a part of both a slack adjuster and a parking brake. As part of the slack adjuster it has helical threads which are engaged by pawls spaced thereabout. As part of the parking brake, it is mounted to be moved axially by a separate actuating element, independently of its movement by the pressure-responsive means, to act on the driven member to hold the brake against release.

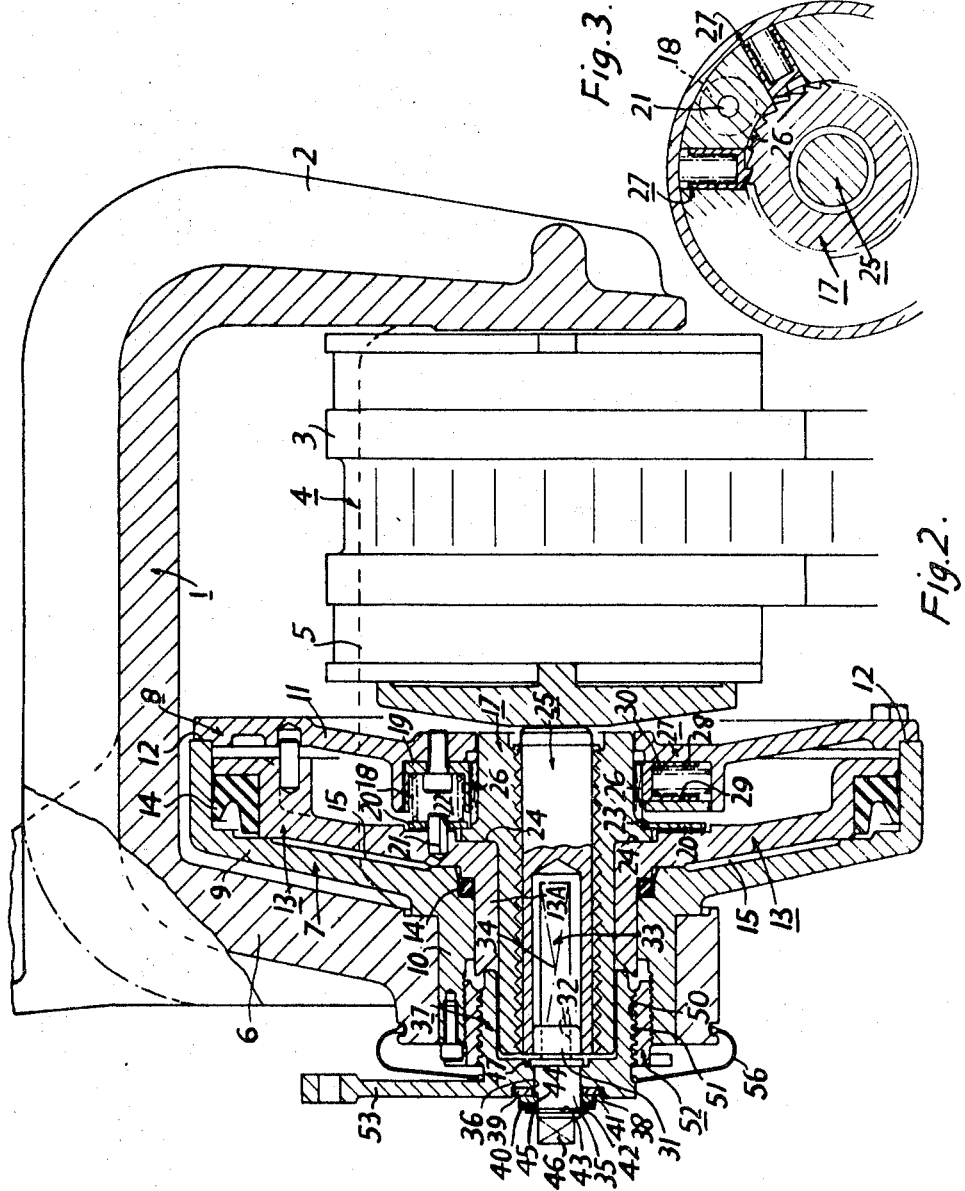

A DISC BRAKE INCLUDING A COMPACT AUTOMATIC SLACK ADJUSTER AND PARKING BRAKE

This invention relates to automatic slack adjusters.

The present invention provides an automatic slack adjuster having a longitudinally movable nonrotatable driving member arranged to drive, through a member, rotatable second member, a normally nonrotatable driven member threadedly engaged with the second member, which second member has helical ratchet teeth engaged by a series of pawls spaced one from another around the second member by other than a whole number of teeth.

The driving member may be constituted by the piston of a piston-and-cylinder arrangement. In this case, the pawls may be carried by the cylinder of the arrangement and may be intersperced with a series of piston return springs. The springs may abut a plate angularly located with respect to the piston which plate may abut the second member which, in turn, abuts the piston.

The second member may be tubular, the threads of which threadedly engaged with the driven member being formed on the internal wall of the second member. With this arrangement, the helical ratchet teeth may be formed on the external wall of the second member.

The driven member, whilst normally being nonrotatable, may be rotatable at will to screw the driven member inwardly or outwardly of the second member and, in this case, the driven member may be provided with a noncircular bore through which extends an element of transverse cross-sectional shape which is complementary to that of the bore whereby the driven member is free to move longitudinally of the bore but rotation of the element effects rotation of the driven member.

The pawls may be provided by elements slidable within complementary housings and the elements may then be resiliently loaded in a direction urging the elements inwardly towards the ratchet teeth on the second member.

The pawls may each be spaced $x+1/n$ teeth from its next adjacent pawl in the series, where $x$ is a whole number and $n$ is the number of pawls: $n$ may be equal to 6.

The slack adjuster may be incorporated in a caliper brake unit, the driven member being connected to a brake element of the unit. In this case, and with the provision of the above-mentioned piston-and-cylinder arrangement, the cylinder of the arrangement may be connected to one leg of the caliper to the other leg of which is connected another brake element. Further the cylinder may carry an element by operation of which after a brake application is made, the piston of the arrangement can be prevented from returning to its "brakes-released" position. The cylinder of the arrangement may have a boss internally threaded and with the threads of which is threadedly engaged the element such that rotation of the element relative to the boss moves the element into a position in which the piston of the arrangement is prevented from returning to the "brakes-released" position. The element may have an arm to which is pivotally connected a further piston-and-cylinder arrangement pressurization of which in a particular manner extends the piston rod to rotate the element.

One embodiment of the present invention will now be described in greater detail, by way of example, with reference to the accompanying drawings of which:

FIG. 2 is a cross-sectional view of the unit shown in FIG. 1, and

FIG. 3 is a cross-sectional view on the line A—A of FIG. 2.

Figure 1:
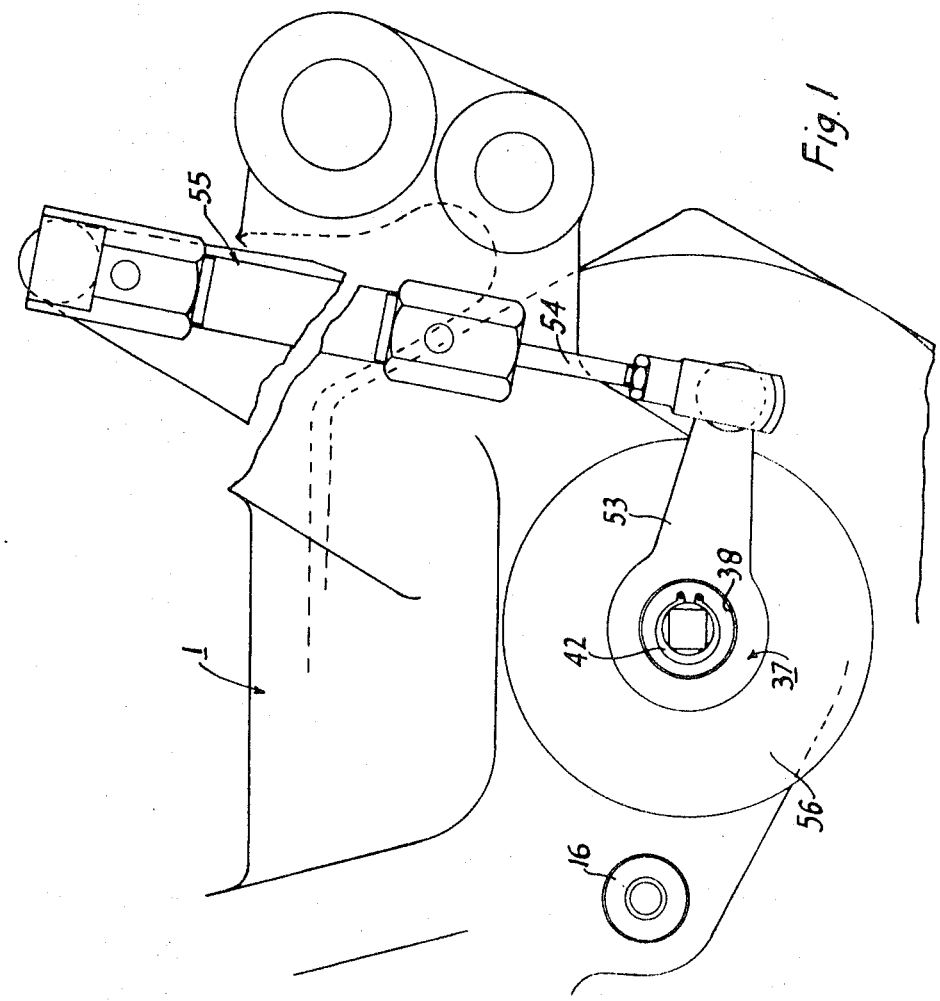
FIG. 1 is an end view of a caliper brake unit.

Referring to the accompanying drawings, the unit comprises of having the form of a caliper 1 on the leg 2 of which is mounted a brake element 3 engageable with one side of a brake disc 4 the opposite side of which is engaged by a second brake element 5.

On the other leg 6 of the caliper 1 is mounted the cylinder 7 of a piston-and-cylinder arrangement 8. The cylinder 7 is constituted by a body portion 9 which has a projecting boss portion 10 by which the cylinder 7 is secured to the leg 6 of the caliper 1, and an end plate 11 which closes the otherwise open end 12 of the cylinder 7.

Within the cylinder 7 is the piston 13 of the piston-and-cylinder arrangement 8 which also has a boss 13A which boss 13A projects into the boss 10 of the cylinder 7. The piston 13 is sealed within the cylinder 7 by seals 14 so that the piston 13 provides with the cylinder 7 a sealed chamber 15 into which opens a port 16 (FIG. 1) BY which air pressure can be introduced into the chamber 15.

The piston 13 constitutes a driving member through the boss 13 of which extends a tubular second member 17. The tubular member 17 is axially slidable relative to the piston 13 but is resiliently loaded by a series of piston return springs 18 (of which one only can be seen in FIG. 2) each located in a cup 19 secured to the end plate 11 of the cylinder 7. The springs 18 each bear at one end against the bottom of its respective cup 19 and at the other end against an annular plate 20 angularly located with respect to the piston 13 by spigots 21 which are secured to the piston 13 and each projects through a complementary aperture 22 in the annular plate 20. The side of the plate 20 opposite to that against which bears the springs 18, bears against a shoulder 23 on the tubular member 17, which is thereby urged into engagement with a shoulder 24 on the piston 13. It will be seen, therefore, that the springs 18 are effective to urge the piston 13 into its position as shown in FIG. 2.

The tubular member 17 has on its internal wall screw threads which are threadedly engaged with complementary shaped threads on the periphery of a shaft 25 constituting a driven member.

The tubular member 17 also has on its external wall adjacent the right-hand end (as seen in FIG. 2) a series of 31 helical ratchet teeth 26. The ratchet teeth are arranged to be engaged with each of a series of pawls 27 of which one only can be seen in FIG. 2 and two only can be seen in FIG. 3. There are, in fact, six such pawls 27 and they are each spaced one from the next adjacent pawl in the series by $x+1/6$ teeth 26. The pawls 27 are each constituted by a piston element 28 slidable within a cylinder 29 and urged resiliently outwardly thereof into engagement with the teeth 26 by the resilient loading impressed by a compression spring 30.

The shaft 25 carries at its right-hand end (as seen in FIG. 2) the brake element 5 and is provided in its hollow left-hand end (as seen in FIG. 2) with a pressed-in bush 31 which has therethrough a bore 32 of square cross section through which passes an element 33 having a body portion 34 of square transverse cross section complementary in shape and dimension to that of the bore 32. Towards its left-hand end as seen in FIG. 2,) the element 33 has a bearing portion 35 which extends through a bore 36 in member 37. Surrounding the outward end of the bore 36 is a recess 38 within which is accommodated a washer 39 between which and a second washer 40 is element 41. The two washers 39 and 40 and the element 41 are retained axially with respect to the element 33 by a circlip 42 accommodated in a circumferential groove 43 on the element 33. The element 41 is radially resilient and has a projection 44 which projects into a flat 45 on the element 33. The extreme left-hand end (as viewed in FIG. 2) of the element 33 is provided with a portion 46 of square cross section with which can be engaged a suitable key. The element 33 also has a radially outwardly extending flange 47 which engages the interior surface of the element 37 and which, together with the washer 39 serves to locate the element 33 with respect to the element 37.

The element 37 is generally of cup shape the interior of which accommodates the left-hand end portion of the tubular member 17 and the external periphery of which is provided with a screw thread 50 threadedly engaged with an internal screw thread 51 of a bush 52 threaded into the boss 10 of the cylinder 7. Projecting radially from the element 37 is an arm 53 pivoted at its outer end to the piston rod 54 of a double-acting piston-and-cylinder arrangement 55.

Surrounding the element 37 is a flexible boot 56 to prevent the ingress of dirt into the interior of the mechanism.

The above described apparatus operates as follows:

The position of the parts shown in the accompanying drawing is that which the parts would have in the event of the brakes being released (i.e. the brake elements 3 and 5 being disengaged from the brake disc 4.)

To apply the brakes, air pressure is applied through the port 16 to the chamber 15 and such application of air pressure causes the cylinder 7 to move to the left (as viewed in the FIG. 2) and the piston 13 to move to the right. Leftward movement of the piston 7 carries with it the caliper 1 thus bringing the brake element 3 into engagement with the rotating disc 4. Rightward movement of the piston 13 carries with it the tubular member 17 and, because of the threaded engagement of that member with the shaft 25, also the shaft 25 thus bringing the brake element 5 into engagement also with the disc 4. The disc 4 is thereby squeezed between the two brake elements 3 and 5 and braking is effected.

During the rightward movement of the member 17, the pawls 27 will be caused to ride along and up the associated ones of the helical ratchet teeth 26. Assuming that there is no excess of slack between the elements 3 and 5 and the disc 4, the rightward movement of the elements 17 will not be sufficient to cause any one of the pawls 27 to ride over its associated tooth 26. Hence, upon subsequent release of the brakes, by exhaust of the air pressure in the chamber 15, the pawls 27 will clearly ride back along and down their associated teeth 26 as the elements 3 and 5 are moved out of engagement with the disc 4.

However, if there is an excess of slack, during the brake application the movement rightward of the tubular member 17 will be sufficient to cause one of the pawls 27 to ride over its associated tooth 26 into engagement with the next successive tooth. In this condition, upon subsequent release of the brakes, the pawl 27 which has ridden over a tooth into engagement with the next successive tooth will continue in engagement with that successive tooth and cause the tubular member 17 to be rotated. Such rotation of the tubular member 17 will be relative to the shaft 25 which will thus be screwed relatively outwardly of the member 17 to reduce the slack between the element 3 and 5 and the disc 4.

In the above-described operation, it will be seen that the shaft 25 must not be permitted to rotate and such rotation is prevented by the element 44 engaging the flat 45 on the element 33.

If, however, it is desired to make a manual adjustment of the slack (as, for example, upon replacement of the elements 3 and 5) such manual adjustment can be effected by rotation of the element 33 by engaging a suitable key with the portion 46 on the element 33 and rotating the element 33 relative to the member 17 to screw the shaft 25 inwardly or outwardly (as required) of the tubular member 17.

Should it be desired to make "parking" brake application, subsequent to the normal application by pressurizing the chamber 15, the piston-and-cylinder arrangement 55 is pressurized in the suitable direction to extend or retract the rod 54. Such extension/retraction of the rod 54 will rotate the element 37 through its arm 53. Rotation of the element 37 will screw it inwardly with respect to the bush 52 so as to bring its inward end into engagement with the left-hand end of the boss 13 thereby preventing return of the piston 13 upon subsequent exhaustion of the chamber 15. By this means, the brakes can be held in after the brake application and provide a parking facility.

Having thus described our invention what we claim is:

1. A disc brake comprising, in combination a brake housing, disc brake elements mounted on the housing for movement to engage and hence brake a rotating disc, a brake actuator situated between the housing and one of said braking elements, said brake actuator including a nonrotatable pressure-responsive member operable under pressure to actuate the brake, a rotatable second member movable axially toward the disc-braking elements by said pressure-responsive member, a normally nonrotatable driven member threadedly engaged with the second member such that said axial movement of the second member towards the disc-braking element moves the driven member to effect brake actuation, a slack adjuster means for taking up wear slack between the braking elements and the rotating disc, said slack adjuster means comprising a set of helical ratchet teeth formed around the second member and a series of pawls engaging the ratchet teeth, the pawls being spaced one from another around the second member by other than a whole number of teeth, whereby slack adjustment is effected when a pawl crosses one of said teeth, as this ultimately causes rotation of the driven member and hence movement of the driven member toward the disc-braking elements relative to the second member, and a parking brake means for preventing the return of the brake, once actuated, to its release position, said parking brake means comprising a further actuating means operable independently of the pressure-responsive means for moving the second member axially to act on the driven member.

2. A disc brake according to claim 1, said housing being a brake caliper having a pair of legs carrying the disc braking elements, said brake actuator located between one of the caliper legs and one of said disc braking elements.

3. A disc brake according to claim 2, said further actuating means comprising a further element axially abutting the second member and including threads formed on the further element, and engaged with threads on the housing, such that rotation of the further element causes axial movement thereof to move the second member axially to actuate the driven member.

4. A disc brake according to claim 1, wherein the pressure-responsive member constitutes a piston of a piston and cylinder arrangement.

5. A disc brake according to claim 4, wherein the pawls are carried by the cylinder of the arrangement, and wherein a series of piston return springs are located in the cylinder interspersed between the pawls.

6. A disc brake according to claim 5, wherein the springs abut a plate which abuts the second member, which in turn abuts the piston.

7. A disc brake according to claim 1, wherein the second member is tubular and the said threads thereof engage with threads of the driven member which are formed on the internal wall of the second member, and wherein the helical ratchet teeth are formed on the external wall of the second member.

8. A disc brake according to claim 1, wherein the driven member, while normally being nonrotatable, is rotatable at will to screw the driven member axially inwardly or outwardly of the second member.

9. A disc brake according to claim 8, wherein the driven member is provided with a noncircular bore through which extends an element of transverse cross-sectional shape which is complementary to that of the bore whereby the driven member is free to move longitudinally of the bore but rotation of the element effects rotation of the driven member.

10. A disc brake according to claim 5, wherein the pawls are provided by elements slidable within complementary bores in the cylinder and the elements are resiliently loaded in a direction urging the elements inwardly towards the ratchet teeth on the second member.

11. A disc brake according to claim 1, wherein the pawls are spaced $x+1/n$ teeth from its next adjacent pawl in the series, where $x$ is a whole number and $n$ is the number of pawls.

12. A disc brake according to claim 4, wherein the cylinder of the arrangement has a boss internally threaded and with the threads of which is threadedly engaged an element by which return of the piston can be prevented, such that rotation of said element relative to the boss moves said element into a position in which the piston of the arrangement is prevented from returning to the brakes-released position.

13. A disc brake according to claim 12, wherein the said element by which return of the piston can be prevented, has an arm to which is pivotally connected a further piston-and-cylinder arrangement, pressurization of which in a particular manner extends the piston rod to rotate the element.